(12) United States Patent
Held

(10) Patent No.: US 12,516,855 B2
(45) Date of Patent: Jan. 6, 2026

(54) HIGH-TEMPERATURE, DUAL RAIL HEAT PUMP CYCLE FOR HIGH PERFORMANCE AT HIGH-TEMPERATURE LIFT AND RANGE

(71) Applicant: Supercritical Storage Company, Inc., Akron, OH (US)

(72) Inventor: Timothy J. Held, Akron, OH (US)

(73) Assignee: Supercritical Storage Company, Inc., Akron, OH (US)

( * ) Notice: Subject to any disclaimer, the term of this patent is extended or adjusted under 35 U.S.C. 154(b) by 176 days.

(21) Appl. No.: 17/974,913

(22) Filed: Oct. 27, 2022

(65) Prior Publication Data
US 2024/0142143 A1    May 2, 2024

(51) Int. Cl.
  *F25B 30/02* (2006.01)
  *F25B 6/00* (2006.01)
  *F25B 9/00* (2006.01)
  *F25B 40/00* (2006.01)

(52) U.S. Cl.
  CPC .............. *F25B 30/02* (2013.01); *F25B 6/00* (2013.01); *F25B 40/00* (2013.01); *F25B 9/008* (2013.01); *F25B 2309/005* (2013.01); *F25B 2309/06* (2013.01); *F25B 2309/061* (2013.01);
  (Continued)

(58) Field of Classification Search
  CPC . F25B 30/02; F25B 2400/05; F25B 2400/054
  See application file for complete search history.

(56) References Cited

U.S. PATENT DOCUMENTS 1,433,883 A    10/1922    Friderich
1,969,526 A    8/1934    Rosch
(Continued)

FOREIGN PATENT DOCUMENTS

CA    2794150 A1    11/2011
CN    1165238 A    11/1997
(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.
(Continued)

*Primary Examiner* — Christopher R Zerphey
(74) *Attorney, Agent, or Firm* — Nolte Lackenbach Siegel; N. Alexander Nolte

(57) ABSTRACT

A dual rail heat pump cycle includes a low-temperature heat source; a two stage, high-temperature heat exchange process through which, in operation, heat is exchanged with a thermal medium; and a working fluid circuit. The working fluid circuit includes an expansion process; a compression process; a recuperation process, and a pair of parallel flow paths. The recuperation process is interposed between the expansion process and the compression process and has a high-pressure side defined by the compression process and a low pressure side defined by the expansion process. The pair of parallel flow paths between the recuperation process and the high-temperature heat exchange process on the high-pressure side of the recuperation process.

21 Claims, 10 Drawing Sheets

(52) U.S. Cl.
CPC ... *F25B 2339/047* (2013.01); *F25B 2400/054* (2013.01); *F25B 2400/141* (2013.01)

(56) References Cited

U.S. PATENT DOCUMENTS

| | | | |
|---|---|---|---|
| 2,418,446 A * | 4/1947 | Anderson | F25B 30/02 |
| | | | 165/104.21 |
| 2,575,478 A | 11/1951 | Wilson | |
| 2,634,375 A | 4/1953 | Guimbal | |
| 2,691,280 A | 10/1954 | Albert | |
| 3,095,274 A | 6/1963 | Crawford | |
| 3,105,748 A | 10/1963 | Stahl | |
| 3,118,277 A | 1/1964 | Wormser | |
| 3,237,403 A | 3/1966 | Feher | |
| 3,277,955 A | 10/1966 | Laszlo | |
| 3,310,954 A | 3/1967 | Sijtstra et al. | |
| 3,401,277 A | 9/1968 | Larson | |
| 3,620,584 A | 11/1971 | Rosensweig | |
| 3,622,767 A | 11/1971 | Koepcke | |
| 3,630,022 A | 12/1971 | Jubb | |
| 3,736,745 A | 6/1973 | Karig | |
| 3,772,879 A | 11/1973 | Engdahl | |
| 3,791,137 A | 2/1974 | Jubb | |
| 3,828,610 A | 8/1974 | Swearingen | |
| 3,830,062 A | 8/1974 | Morgan et al. | |
| 3,831,381 A | 8/1974 | Swearingen | |
| 3,939,328 A | 2/1976 | Davis | |
| 3,971,211 A | 7/1976 | Wethe | |
| 3,977,197 A | 8/1976 | Brantley, Jr. | |
| 3,982,379 A | 9/1976 | Gilli | |
| 3,986,359 A | 10/1976 | Manning et al. | |
| 3,991,588 A | 11/1976 | Laskaris | |
| 3,998,058 A | 12/1976 | Park | |
| 4,003,786 A | 1/1977 | Cahn | |
| 4,005,580 A | 2/1977 | Swearingen | |
| 4,009,575 A | 3/1977 | Hartman, Jr. | |
| 4,015,962 A | 4/1977 | Tompkins | |
| 4,029,255 A | 6/1977 | Heiser | |
| 4,030,312 A | 6/1977 | Wallin | |
| 4,037,413 A | 7/1977 | Heller et al. | |
| 4,049,407 A | 9/1977 | Bottum | |
| 4,070,870 A | 1/1978 | Bahel | |
| 4,071,897 A | 1/1978 | Groves, Jr. et al. | |
| 4,089,744 A | 5/1978 | Cahn | |
| 4,099,381 A | 7/1978 | Rappoport | |
| 4,110,987 A | 9/1978 | Cahn et al. | |
| 4,119,140 A | 10/1978 | Cates | |
| 4,150,547 A | 4/1979 | Hobson | |
| 4,152,901 A | 5/1979 | Munters | |
| 4,164,848 A | 8/1979 | Gilli | |
| 4,164,849 A | 8/1979 | Mangus | |
| 4,170,435 A | 10/1979 | Swearingen | |
| 4,178,762 A | 12/1979 | Binstock et al. | |
| 4,182,960 A | 1/1980 | Reuyl | |
| 4,183,220 A | 1/1980 | Shaw | |
| 4,198,827 A | 4/1980 | Terry et al. | |
| 4,208,882 A | 6/1980 | Lopes | |
| 4,221,185 A | 9/1980 | Scholes | |
| 4,233,085 A | 11/1980 | Roderick | |
| 4,236,869 A | 12/1980 | Laurello | |
| 4,245,476 A | 1/1981 | Shaw | |
| 4,248,049 A | 2/1981 | Briley | |
| 4,257,232 A | 3/1981 | Bell | |
| 4,285,203 A | 8/1981 | Vakil | |
| 4,287,430 A | 9/1981 | Guido | |
| 4,336,692 A | 6/1982 | Ecker | |
| 4,347,711 A | 9/1982 | Noe | |
| 4,347,714 A | 9/1982 | Kinsell | |
| 4,364,239 A | 12/1982 | Chappelle et al. | |
| 4,372,125 A | 2/1983 | Dickenson | |
| 4,374,467 A | 2/1983 | Briley | |
| 4,384,568 A | 5/1983 | Palmatier | |
| 4,390,082 A | 6/1983 | Swearingen | |
| 4,391,101 A | 7/1983 | Labbe | |
| 4,420,947 A | 12/1983 | Yoshino | |
| 4,428,190 A | 1/1984 | Bronicki | |
| 4,433,554 A | 2/1984 | Rojey | |
| 4,439,687 A | 3/1984 | Wood | |
| 4,439,994 A | 4/1984 | Briley | |
| 4,445,180 A | 4/1984 | Davis | |
| 4,448,033 A | 5/1984 | Briccetti | |
| 4,450,363 A | 5/1984 | Russell | |
| 4,455,836 A | 6/1984 | Binstock | |
| 4,467,609 A | 8/1984 | Loomis | |
| 4,467,621 A | 8/1984 | O'Brien | |
| 4,471,622 A | 9/1984 | Kuwahara | |
| 4,475,353 A | 10/1984 | Lazare | |
| 4,489,562 A | 12/1984 | Snyder | |
| 4,489,563 A | 12/1984 | Kalina | |
| 4,498,289 A | 2/1985 | Osgerby | |
| 4,507,936 A | 4/1985 | Yoshino | |
| 4,516,403 A | 5/1985 | Tanaka | |
| 4,538,960 A | 9/1985 | Iino et al. | |
| 4,549,401 A | 10/1985 | Spliethoff | |
| 4,555,905 A | 12/1985 | Endou | |
| 4,558,228 A | 12/1985 | Larjola | |
| 4,573,321 A | 3/1986 | Knaebel | |
| 4,578,953 A | 4/1986 | Krieger | |
| 4,589,255 A | 5/1986 | Martens | |
| 4,636,578 A | 1/1987 | Feinberg | |
| 4,665,975 A | 5/1987 | Johnson | |
| 4,674,297 A | 6/1987 | Vobach | |
| 4,694,189 A | 9/1987 | Haraguchi | |
| 4,697,981 A | 10/1987 | Brown et al. | |
| 4,700,543 A | 10/1987 | Krieger | |
| 4,730,977 A | 3/1988 | Haaser | |
| 4,756,162 A | 7/1988 | Dayan | |
| 4,765,143 A | 8/1988 | Crawford | |
| 4,773,212 A | 9/1988 | Griffin | |
| 4,798,056 A | 1/1989 | Franklin | |
| 4,813,242 A | 3/1989 | Wicks | |
| 4,821,514 A | 4/1989 | Schmidt | |
| 4,867,633 A | 9/1989 | Gravelle | |
| 4,884,942 A | 12/1989 | Pennink | |
| 4,888,954 A | 12/1989 | Silvestri, Jr. | |
| 4,892,459 A | 1/1990 | Guelich | |
| 4,986,071 A | 1/1991 | Voss | |
| 4,993,483 A | 2/1991 | Harris | |
| 5,000,003 A | 3/1991 | Wicks | |
| 5,050,375 A | 9/1991 | Dickinson | |
| 5,080,047 A | 1/1992 | Williams et al. | |
| 5,083,425 A | 1/1992 | Hendriks et al. | |
| 5,098,194 A | 3/1992 | Kuo | |
| 5,102,295 A | 4/1992 | Pope | |
| 5,104,284 A | 4/1992 | Hustak, Jr. | |
| 5,164,020 A | 11/1992 | Wagner | |
| 5,176,321 A | 1/1993 | Doherty | |
| 5,203,159 A | 4/1993 | Koizumi et al. | |
| 5,228,310 A | 7/1993 | Vandenberg | |
| 5,248,239 A | 9/1993 | Andrews | |
| 5,291,509 A | 3/1994 | Mizoguchi et al. | |
| 5,291,960 A | 3/1994 | Brandenburg | |
| 5,320,482 A | 6/1994 | Palmer et al. | |
| 5,321,944 A | 6/1994 | Bronicki et al. | |
| 5,335,510 A | 8/1994 | Rockenfeller | |
| 5,358,378 A | 10/1994 | Holscher | |
| 5,360,057 A | 11/1994 | Rockenfeller | |
| 5,384,489 A | 1/1995 | Bellac | |
| 5,392,606 A | 2/1995 | Labinov | |
| 5,440,882 A | 8/1995 | Kalina | |
| 5,444,972 A | 8/1995 | Moore | |
| 5,483,797 A | 1/1996 | Rigal et al. | |
| 5,487,822 A | 1/1996 | Demaray et al. | |
| 5,488,828 A | 2/1996 | Brossard | |
| 5,490,386 A | 2/1996 | Keller | |
| 5,503,222 A | 4/1996 | Dunne | |
| 5,531,073 A | 7/1996 | Bronicki | |
| 5,538,564 A | 7/1996 | Kaschmitter | |
| 5,542,203 A | 8/1996 | Luoma | |
| 5,544,479 A | 8/1996 | Yan et al. | |
| 5,570,578 A | 11/1996 | Saujet | |
| 5,588,298 A | 12/1996 | Kalina | |
| 5,600,967 A | 2/1997 | Meckler | |
| 5,609,465 A | 3/1997 | Batson et al. | |

(56) References Cited

U.S. PATENT DOCUMENTS

| | | |
|---|---|---|
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,685,152 A | 11/1997 | Sterling |
| 5,704,206 A | 1/1998 | Kaneko et al. |
| 5,738,164 A | 4/1998 | Hildebrand |
| 5,754,613 A | 5/1998 | Hashiguchi |
| 5,771,700 A | 6/1998 | Cochran |
| 5,782,081 A | 7/1998 | Pak et al. |
| 5,789,822 A | 8/1998 | Calistrat |
| 5,799,490 A | 9/1998 | Bronicki et al. |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,884,470 A | 3/1999 | Frutschi |
| 5,894,836 A | 4/1999 | Wu |
| 5,899,067 A | 5/1999 | Hageman |
| 5,901,783 A | 5/1999 | Dobak, III et al. |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,954,342 A | 9/1999 | Mikhalev et al. |
| 5,973,050 A | 10/1999 | Johnson |
| 6,037,683 A | 3/2000 | Lulay |
| 6,041,604 A | 3/2000 | Nicodemus |
| 6,058,695 A | 5/2000 | Ranasinghe |
| 6,058,930 A | 5/2000 | Shingleton |
| 6,059,450 A | 5/2000 | McClure |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,233,955 B1 | 5/2001 | Egara |
| 6,282,900 B1 | 9/2001 | Bell |
| 6,282,917 B1 | 9/2001 | Mongan |
| 6,295,818 B1 | 10/2001 | Ansley |
| 6,298,653 B1 | 10/2001 | Lawlor |
| 6,299,690 B1 | 10/2001 | Mongeon |
| 6,341,781 B1 | 1/2002 | Matz |
| 6,347,520 B1 | 2/2002 | Ranasinghe et al. |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,490,812 B1 | 12/2002 | Bennett et al. |
| 6,530,224 B1 | 3/2003 | Conchieri |
| 6,539,720 B2 | 4/2003 | Rouse et al. |
| 6,539,728 B2 | 4/2003 | Korin |
| 6,563,855 B1 | 5/2003 | Nishi et al. |
| 6,571,548 B1 | 6/2003 | Bronicki |
| 6,581,384 B1 | 6/2003 | Benson |
| 6,588,499 B1 | 7/2003 | Fahlsing |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,892,522 B2 | 5/2005 | Brasz et al. |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,962,056 B2 | 11/2005 | Brasz et al. |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,553 B2 | 4/2006 | Johnston |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,343,746 B2 | 3/2008 | Pierson |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,673,681 B2 | 3/2010 | Vinegar et al. |
| 7,685,820 B2 | 3/2010 | Litwin et al. |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |

(56) References Cited

U.S. PATENT DOCUMENTS

| | | | |
|---|---|---|---|
| 7,950,230 B2 | 5/2011 | Nishikawa |
| 7,950,243 B2 | 5/2011 | Gurin |
| 7,971,424 B2 | 7/2011 | Masada |
| 7,972,529 B2 | 7/2011 | Machado |
| 7,997,076 B2 | 8/2011 | Ernst |
| 8,015,790 B2 | 9/2011 | Zhang et al. |
| 8,096,128 B2 | 1/2012 | Held et al. |
| 8,099,198 B2 | 1/2012 | Gurin |
| 8,099,972 B2 | 1/2012 | Dupraz |
| 8,146,360 B2 | 4/2012 | Myers |
| 8,235,647 B2 | 8/2012 | Pisseloup et al. |
| 8,281,593 B2 | 10/2012 | Held |
| 8,289,710 B2 | 10/2012 | Spearing et al. |
| 8,297,065 B2 | 10/2012 | Vaisman et al. |
| 8,375,719 B2 | 2/2013 | Rhodes et al. |
| 8,387,248 B2 | 3/2013 | Rolt et al. |
| 8,419,936 B2 | 4/2013 | Berger et al. |
| 8,544,274 B2 | 10/2013 | Ernst |
| 8,584,463 B2 | 11/2013 | Hemrle et al. |
| 8,613,195 B2 | 12/2013 | Held et al. |
| 8,661,820 B2 | 3/2014 | Mak |
| 8,813,497 B2 | 8/2014 | Hart et al. |
| 8,820,083 B2 | 9/2014 | Davidson et al. |
| 8,869,531 B2 | 10/2014 | Held |
| 8,973,398 B2 | 3/2015 | Coyle |
| 9,038,390 B1 | 5/2015 | Kreuger |
| 9,180,421 B2 | 11/2015 | Kwang et al. |
| 9,360,241 B2 * | 6/2016 | Nakayama ............... F25B 30/02 |
| 9,523,312 B2 | 12/2016 | Allam et al. |
| 9,593,872 B2 * | 3/2017 | Takenaka ................. F25B 6/04 |
| 9,638,065 B2 | 5/2017 | Vermeersch et al. |
| 9,759,449 B2 * | 9/2017 | Ootani ................ F24D 19/1054 |
| 9,810,451 B2 | 11/2017 | O'Donnell et al. |
| 9,845,667 B2 | 12/2017 | Mokheimer et al. |
| 9,874,112 B2 | 1/2018 | Giegel |
| 9,932,861 B2 | 4/2018 | Preuss et al. |
| 10,077,683 B2 | 9/2018 | Close |
| 10,495,360 B2 * | 12/2019 | Takayama ........... F04B 39/0061 |
| 10,539,341 B2 * | 1/2020 | Lilie .................... F25B 41/375 |
| 2001/0015061 A1 | 8/2001 | Viteri et al. |
| 2001/0020444 A1 | 9/2001 | Johnston |
| 2001/0027642 A1 | 10/2001 | Tsuji |
| 2001/0030952 A1 | 10/2001 | Radhika |
| 2002/0029558 A1 | 3/2002 | Tamaro |
| 2002/0053196 A1 | 5/2002 | Lerner et al. |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2002/0148225 A1 | 10/2002 | Lewis |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2004/0247211 A1 | 12/2004 | Hamke |
| 2005/0022963 A1 | 2/2005 | Garrabrant et al. |
| 2005/0056001 A1 | 3/2005 | Frutschi |
| 2005/0072182 A1 | 4/2005 | Taniguchi et al. |
| 2005/0096676 A1 | 5/2005 | Gifford, III et al. |
| 2005/0109387 A1 | 5/2005 | Marshall |
| 2005/0118025 A1 | 6/2005 | Hiegemann et al. |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2005/0262848 A1 | 12/2005 | Joshi et al. |
| 2005/0276685 A1 | 12/2005 | Wiggins et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0112702 A1 | 6/2006 | Martin et al. |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0222523 A1 | 10/2006 | Valentian et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0007771 A1 | 1/2007 | Biddle et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0116299 A1 | 5/2007 | Vanderwall et al. |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0134681 A1 | 6/2008 | Nayef et al. |
| 2008/0135253 A1 | 6/2008 | Vinegar et al. |
| 2008/0163618 A1 | 7/2008 | Paul |
| 2008/0163625 A1 | 7/2008 | O'Brien |
| 2008/0173444 A1 | 7/2008 | Stone et al. |
| 2008/0173450 A1 | 7/2008 | Goldberg et al. |
| 2008/0174115 A1 | 7/2008 | Lambirth |
| 2008/0211230 A1 | 9/2008 | Gurin |
| 2008/0217321 A1 | 9/2008 | Vinegar et al. |
| 2008/0250789 A1 | 10/2008 | Myers et al. |
| 2008/0252078 A1 | 10/2008 | Myers |
| 2008/0282702 A1 | 11/2008 | Collins |
| 2008/0282715 A1 | 11/2008 | Aue et al. |
| 2009/0021251 A1 | 1/2009 | Simon |
| 2009/0071156 A1 | 3/2009 | Nishikawa et al. |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0179429 A1 | 7/2009 | Ellis et al. |
| 2009/0180903 A1 | 7/2009 | Martin et al. |
| 2009/0205892 A1 | 8/2009 | Jensen et al. |
| 2009/0211251 A1 | 8/2009 | Peterson et al. |
| 2009/0211253 A1 | 8/2009 | Radcliff et al. |

(56) References Cited

U.S. PATENT DOCUMENTS

| | | |
|---|---|---|
| 2009/0257902 A1 | 10/2009 | Ernens |
| 2009/0266075 A1 | 10/2009 | Westmeier et al. |
| 2009/0293503 A1 | 12/2009 | Vandor |
| 2009/0320477 A1 | 12/2009 | Juchymenko |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0143094 A1 | 6/2010 | Pisseloup et al. |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0212316 A1 | 8/2010 | Waterstripe et al. |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287920 A1 | 11/2010 | Duparchy |
| 2010/0287934 A1 | 11/2010 | Glynn et al. |
| 2010/0300093 A1 | 12/2010 | Doty |
| 2010/0319346 A1 | 12/2010 | Ast et al. |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0051880 A1 | 3/2011 | Al-Mayahi et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0100002 A1 | 5/2011 | Muir et al. |
| 2011/0100611 A1 | 5/2011 | Ohler et al. |
| 2011/0113781 A1 | 5/2011 | Frey et al. |
| 2011/0164957 A1 | 7/2011 | Rivas et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0214424 A1 | 9/2011 | Wood |
| 2011/0219760 A1 | 9/2011 | McBride et al. |
| 2011/0259010 A1 | 10/2011 | Bronicki et al. |
| 2011/0270451 A1 | 11/2011 | Sakaguchi et al. |
| 2011/0286724 A1 | 11/2011 | Goodman |
| 2011/0288688 A1 | 11/2011 | Lehan |
| 2011/0299972 A1 | 12/2011 | Morris |
| 2011/0308253 A1 | 12/2011 | Ritter |
| 2012/0000236 A1* | 1/2012 | Ogata .................. F24D 3/18 62/324.2 |
| 2012/0027688 A1 | 2/2012 | Hui et al. |
| 2012/0042650 A1 | 2/2012 | Ernst et al. |
| 2012/0047889 A1 | 3/2012 | Ulas Acikgoz et al. |
| 2012/0047892 A1 | 3/2012 | Held et al. |
| 2012/0055153 A1 | 3/2012 | Murata et al. |
| 2012/0067046 A1 | 3/2012 | Drenik et al. |
| 2012/0067055 A1 | 3/2012 | Held |
| 2012/0111003 A1 | 5/2012 | Kasuya et al. |
| 2012/0125002 A1 | 5/2012 | Lehar et al. |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0167873 A1 | 7/2012 | Venetos et al. |
| 2012/0174558 A1 | 7/2012 | Gurin |
| 2012/0186219 A1 | 7/2012 | Gurin |
| 2012/0240616 A1 | 9/2012 | Ritter et al. |
| 2012/0247134 A1 | 10/2012 | Gurin |
| 2012/0247455 A1 | 10/2012 | Gurin et al. |
| 2012/0255304 A1 | 10/2012 | Li et al. |
| 2012/0261090 A1 | 10/2012 | Durmaz et al. |
| 2012/0261104 A1 | 10/2012 | Kelly et al. |
| 2012/0306206 A1 | 12/2012 | Agrawal et al. |
| 2012/0319410 A1 | 12/2012 | Ambrosek et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0074497 A1 | 3/2013 | Mori et al. |
| 2013/0087301 A1 | 4/2013 | Hemrle et al. |
| 2013/0113221 A1 | 5/2013 | Held |
| 2013/0134720 A1 | 5/2013 | Fukasaku et al. |
| 2013/0145759 A1 | 6/2013 | Sonwane et al. |
| 2014/0041387 A1 | 2/2014 | Benson |
| 2014/0090405 A1 | 4/2014 | Held et al. |
| 2014/0096521 A1 | 4/2014 | Held et al. |
| 2014/0102098 A1 | 4/2014 | Bowan et al. |
| 2014/0102103 A1 | 4/2014 | Yamamoto et al. |
| 2014/0109613 A1* | 4/2014 | Ohno .................. F25B 13/00 62/498 |
| 2014/0116082 A1* | 5/2014 | Kawakami .............. F25B 40/02 62/324.6 |
| 2014/0150992 A1 | 6/2014 | Koontz et al. |
| 2014/0208750 A1 | 7/2014 | Vermeersch |
| 2014/0208751 A1 | 7/2014 | Bowan |
| 2014/0216034 A1 | 8/2014 | Numata et al. |
| 2014/0223907 A1 | 8/2014 | Fujioka et al. |
| 2014/0224447 A1 | 8/2014 | Reznik et al. |
| 2015/0069758 A1 | 3/2015 | Davidson et al. |
| 2015/0369086 A1 | 12/2015 | Johnson et al. |
| 2016/0017759 A1 | 1/2016 | Gayawal et al. |
| 2016/0040557 A1 | 2/2016 | Vermeersch et al. |
| 2016/0102608 A1 | 4/2016 | Lynn |
| 2016/0237904 A1 | 8/2016 | Scarboro et al. |
| 2017/0058202 A1 | 3/2017 | Noureldin et al. |
| 2017/0350658 A1 | 12/2017 | Kerth et al. |
| 2017/0362963 A1 | 12/2017 | Hostler et al. |
| 2018/0187628 A1 | 7/2018 | Apte |
| 2018/0283222 A1 | 10/2018 | Park et al. |
| 2018/0340712 A1 | 11/2018 | Peter et al. |
| 2019/0017417 A1 | 1/2019 | Cha |
| 2019/0170026 A1 | 6/2019 | Matsukuma et al. |
| 2020/0003081 A1 | 1/2020 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| DE | 102007020086 B3 | 4/2007 |
| DE | 10 2011005722 B3 | 3/2011 |
| EP | 0003980 A1 | 2/1979 |
| EP | 0286565 A2 | 4/1988 |
| EP | 1484489 A2 | 8/2004 |
| EP | 1577549 A1 | 9/2005 |
| EP | 1977174 A2 | 10/2008 |
| EP | 1998013 A2 | 12/2008 |
| EP | 2157317 A2 | 2/2010 |
| EP | 2241737 A1 | 10/2010 |
| EP | 2312129 A1 | 4/2011 |
| EP | 2357324 A2 | 9/2011 |
| EP | 2390473 A1 | 11/2011 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A1 | 1/2013 |
| EP | 2698506 A1 | 2/2014 |
| GB | 856985 A | 12/1960 |
| GB | 2010974 A | 7/1979 |
| GB | 2075608 A | 11/1981 |
| JP | 58-193051 A | 11/1983 |
| JP | 60-040707 A | 3/1985 |
| JP | 61-152914 A | 7/1986 |
| JP | 01-240705 A | 9/1989 |
| JP | H03182638 A | 8/1991 |
| JP | 05-321612 A | 12/1993 |
| JP | 05-321648 A | 12/1993 |

(56) References Cited

FOREIGN PATENT DOCUMENTS

| | | |
|---|---|---|
| JP | 06-331225 A | 11/1994 |
| JP | 08-028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11-270352 | 5/1999 |
| JP | 2000-257407 A | 9/2000 |
| JP | 3119718 B2 | 12/2000 |
| JP | 2001-193419 A | 7/2001 |
| JP | 2002-097965 A | 4/2002 |
| JP | 2003-529715 A | 10/2003 |
| JP | 2004-239250 A | 8/2004 |
| JP | 2004-332626 A | 11/2004 |
| JP | 2005-030727 A | 2/2005 |
| JP | 2005-533972 A1 | 11/2005 |
| JP | 2006-037760 A | 2/2006 |
| JP | 2006-177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10_2007_0086244 A | 8/2007 |
| KR | 10-0766101 B1 | 10/2007 |
| KR | 10-0844634 A | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 1991/05145 A1 | 4/1991 |
| WO | WO 92/12366 A1 | 7/1992 |
| WO | WO 1996/009500 A1 | 3/1996 |
| WO | WO 00-71944 A1 | 11/2000 |
| WO | WO 2001/044658 A1 | 6/2001 |
| WO | WO 02/090721 A1 | 11/2002 |
| WO | WO 02/090747 A2 | 11/2002 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008014774 A2 | 2/2008 |
| WO | WO 2008/039725 A2 | 4/2008 |
| WO | WO 2008/101711 A2 | 8/2008 |
| WO | WO 2009/045196 A1 | 4/2009 |
| WO | WO 2009/058992 A2 | 5/2009 |
| WO | WO 2010/006942 A1 | 2/2010 |
| WO | WO 2010/017981 A2 | 2/2010 |
| WO | WO 2010/017981 A3 | 2/2010 |
| WO | WO 2010/074173 A1 | 7/2010 |
| WO | WO 2010/083198 A1 | 7/2010 |
| WO | WO 2014/114531 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/036678 A1 | 3/2012 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |
| WO | WO 2014/164620 A1 | 3/2014 |
| WO | WO 2014/138035 A1 | 9/2014 |
| WO | WO 2014/159520 A1 | 10/2014 |
| WO | WO 2016/150455 A1 | 9/2016 |
| WO | WO 2018/217969 A1 | 11/2018 |
| WO | WO 2020/90721 A1 | 7/2020 |
| WO | WO2021/225755 A1 | 11/2021 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chinese Search Report for Application No. 201080035382.1, 2 pages.

Chinese Search Report for Application No. 201080050795.7, 2 pages.

Chordia, Lalit, "Optimizing Equipment for Supercritical Applications", Thar Energy LLC, Supercritical CO2 Power Cycle Symposium, May 24-25, 2011, Boulder, CO, 7 pages.

Colegrove, et al., "Structured Steam Turbines for the Combined-Cycle Market", GE Power Systems, GER-4201, May 2001, 18 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages., (7 parts).

Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Ebenezer, Salako A.; "Removal of Carbon Dioxide from Natural Gas for LNG Production", Institute of Petroleum Technology Norwegian University of Science and Technology, Dec. 2005, Trondheim, Norway, 74 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

(56) References Cited

OTHER PUBLICATIONS

Feher, E.G., et al., "Investigation of Supercritical (Feher) Cycle", Astropower Laboratory, Missile & Space Systems Division, Oct. 1968, 152 pages.
Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.
Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.
Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.
Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.
Gowrishankar, K., "Adaptive Fuzzy Controller to Control Turbine Speed", Rajiv Gandhi College of Engg. & tech., Puducherry, India, 7 pages.
Hjartarson, Heimir; "Waste Heat Utilization at Elkem Ferrosilicon Plant in Iceland", University of Iceland, 2009, 102 pages.
Hjartarson, et al.; "Waste Heat Utilization from a Submerged ARC Furnace Producing Ferrosilicon", The Twelfth International Ferroalloys Congress Sustainable Future; , Helsinki, Finland ,Jun. 6-9, 2010, 10 pages.
Hejzlar, P. et al., "Assessment of Gas Cooled Gas Reactor with Indirect Supercritical CO2 Cycle" Massachusetts Institute of Technology, Jan. 2006, 10 pages.
Hoffman, John R., and Feher, E.G., "150 kwe Supercritical Closed Cycle System", Transactions of the ASME, Jan. 1971, pp. 70-80.
Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.
Johnson, Gregory A., & Mcdowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).
Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Mohamed, Omar, et al., "Modelling Study of Supercritical Power Plant and Parameter Identified Using Genetic Algorithms", Proceedings of the World Congress on Engineering 2010 vol. II, WCE 2010, Jun. 30-Jul. 2, 2010, London, U.K., 6 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.
Noriega, Bahamonde J.S., "Design Method for s-CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044681—International Search Report and Written Opinion mailed Oct. 7, 2010, 10 pages.
PCT/US2010/044681—International Preliminary Report on Patentability dated Feb. 16, 2012, 9 pages.
PCT/US2010/044476—International Search Report dated Sep. 29, 2010, 23 pages.
PCT/US2007/001120—International Search Report dated Apr. 25, 2008, 7 pages.
PCT/US2006/049623—Written Opinion of ISA dated Jan. 4, 2008, 4 pages.
PCT/US2007/079318—International Preliminary Report on Patentability dated Jul. 7, 2008, 5 pages.
PCT/US2013/055547—Notification of Transmittal of the International Search Report and the Written Opinion of the International Searching Authority, or the Declaration dated Jan. 24, 2014, 11 pages.

(56) References Cited

OTHER PUBLICATIONS

PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/023026—Notification of Transmittal of the International Search Report and the Written Opinion of the International Searching Authority, or the Declaration dated Jul. 22, 2014, 11 pages.
PCT/US2014/013170—Notification of Transmittal of the International Search Report and the Written Opinion of the International Searching Authority, or the Declaration dated May 9, 2014, 12 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062198—Extended European Search Report dated May 6, 2014, 9 pages.
PCT/US2011/062201—International Search Report and Written Opinion dated Jun. 26, 2012, 9 pages.
PCT/US2011/062201—Extended European Search Report dated May 28, 2014, 8 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2014/013154—International Search Report dated May 23, 2014, 4 pages.
PCT/US2014/024548—International Search Report and Written Opinion dated Sep. 5, 2014, 11 pages.
PCT/US2013/064475—International Search Report and Written Opinion dated Jan. 16, 2014, 11 pages.
PCT/US2014/024254—International Search Report and Written Opinion dated Aug. 13, 2014, 10 pages.
PCT/US2014/026173—Notification of Transmittal of the International Search Report and the Written Opinion of the International Searching Authority, or the Declaration dated Jul. 9, 2014, 10 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
PCT/US2014/024305—Notification of Transmittal of the International Search Report and the Written Opinion of the International Searching Authority, or the Declaration dated Aug. 26, 2014, 11 pages.
PCT/US2014/023990—Notification of Transmittal of the International Search Report and the Written Opinion of the International Searching Authority, or the Declaration dated Jul. 17, 2014, 10 pages.
PCT/US2015/57701—Notification of Transmittal of the International Search Report and the Written Opinion of the International Searching Authority, or the Declaration dated Dec. 22, 2015, 11 pages.
PCT/US2015/57756—Notification of Transmittal of the International Search Report and the Written Opinion of the International Searching Authority, or the Declaration dated Jul. 27, 2017, 41 pages.
PCT/US2014/020242—Notification of Transmittal of the International Search Report and the Written Opinion of the International Searching Authority, or the Declaration dated Aug. 5, 2014, 9 pages.
PCT/US2018/034289—Notification of Transmittal of the International Search Report and the Written Opinion of the International Searching Authority, or the Declaration dated Oct. 2, 2018, 22 pages.
"Steam Turbines", PDHengineer.com Course No. M-3006.
Steam Turbines (Energy Engineering) http://what-when-how.com/energy-engineering/steam-turbines-energy-engineering/, Oct. 25, 2012, 14 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Pruess, Karsten, "Enhanced Geothermal Systems (EGS): Comparing Water and CO2 as Heat Transmission Fluids", Proceedings, New Zealand Geothermal Workshop 2007 Auckland, New Zealand, Nov. 19-21, 2007, 13 pages.
Pruess, Karsten, "Enhanced Geothermal Systems (EGS): Using CO2 as Working Fluid—A Novel Approach for Generating Renewable Energy with Simultaneous Sequestration of Carbon", Submitted to Geothermics, Jun. 2006, 26 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
Tom, Samsun Kwok Sun, "The Feasibility of Using Supercritical Carbon Dioxide as a Coolant for the Candu Reactor", The University of British Columbia, Jan. 1978, 156 pages.
"Two-flow rotors"; http://www.answers.com/topic/steam-turbine#ixzz2AJsKAwHX.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

(56) References Cited

OTHER PUBLICATIONS

PCT/US2023/036028—International Search Report and Written Opinion dated Feb. 22, 2024, 14 pages.

* cited by examiner

HIGH-TEMPERATURE, DUAL RAIL HEAT PUMP CYCLE FOR HIGH PERFORMANCE AT HIGH-TEMPERATURE LIFT AND RANGE

TECHNICAL FIELD

This disclosure pertains to a heat pump cycle and, more particularly, to a heat pump cycle for high performance at high-temperature lift and high-temperature range.

DESCRIPTION OF THE RELATED ART

In some industrial processes, heat needs to be applied to one or more materials at a relatively high temperature. The most common method of creating this heat is through the combustion of fossil fuels. However, as the world moves towards a carbon-free energy system, alternative techniques for providing industrial heat will be desired. While direct electrical heating with devices such as electric resistance heaters, electric arc heaters, or electrical induction heaters can attain the necessary temperatures, the coefficient of performance ("COP") of these processes can never be greater than 1. As used in this context, the COP is defined as the amount of heat transferred to the process divided by the electrical power input.

These forms of direct electrical heating discussed in the paragraph immediately above are also potentially utilized in converting electrical power to thermal power, which can be stored for later use in so-called "electro-thermal energy storage" systems. In those cases, the round-trip efficiency of such a system is the mathematical product of the COP and the generating cycle efficiency. Because of the characteristics of the aforementioned heating system, the round-trip efficiency ("RTE") of the overall storage process will be less than the efficiency of the power cycle used to convert the thermal energy back to electricity, typically ~40% for temperatures in the 550-600° C. range.

SUMMARY

In a first aspect, a dual rail heat pump cycle, comprises a low-temperature heat source; a two stage, high-temperature heat exchange process through which, in operation, heat is exchanged with a thermal medium; and a working fluid circuit. The working fluid circuit includes an expansion process; a compression process; a recuperation process, and a pair of parallel flow paths. The recuperation process is interposed between the expansion process and the compression process and has a high-pressure side defined by the compression process and a low pressure side defined by the expansion process. The pair of parallel flow paths between the recuperation process and the high-temperature heat exchange process on the high-pressure side of the recuperation process.

In another aspect, a dual rail heat pump cycle includes a low-temperature heat source and a working fluid circuit through which, in operation, a working fluid circulates. The working fluid circuit includes a recuperator, a compression device, an expansion device, a pair of high-temperature heat exchangers, and a pair of parallel flow paths. The expansion device is downstream from the high-pressure side of the first recuperator, upstream from the low-temperature heat source, and defines a low-pressure side of the recuperator. The pair of parallel flow paths extend between the recuperator and the high-temperatures heat exchangers on the high-pressure side of the recuperator.

The above presents a simplified summary in order to provide a basic understanding of some aspects of the invention. This summary is not an exhaustive overview of the invention. It is not intended to identify key or critical elements of the disclosure or to delineate the scope of the invention. Its sole purpose is to present some concepts in a simplified form as a prelude to the more detailed description that is discussed later.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

While the disclosed technique is susceptible to various modifications and alternative forms, the drawings illustrate specific embodiments herein described in detail by way of example. It should be understood, however, that the description herein of specific embodiments is not intended to limit that which is claimed to the particular forms disclosed, but on the contrary, the intention is to cover all modifications, equivalents, and alternatives falling within the spirit and scope of the appended claims.

DETAILED DESCRIPTION

Figure 1:
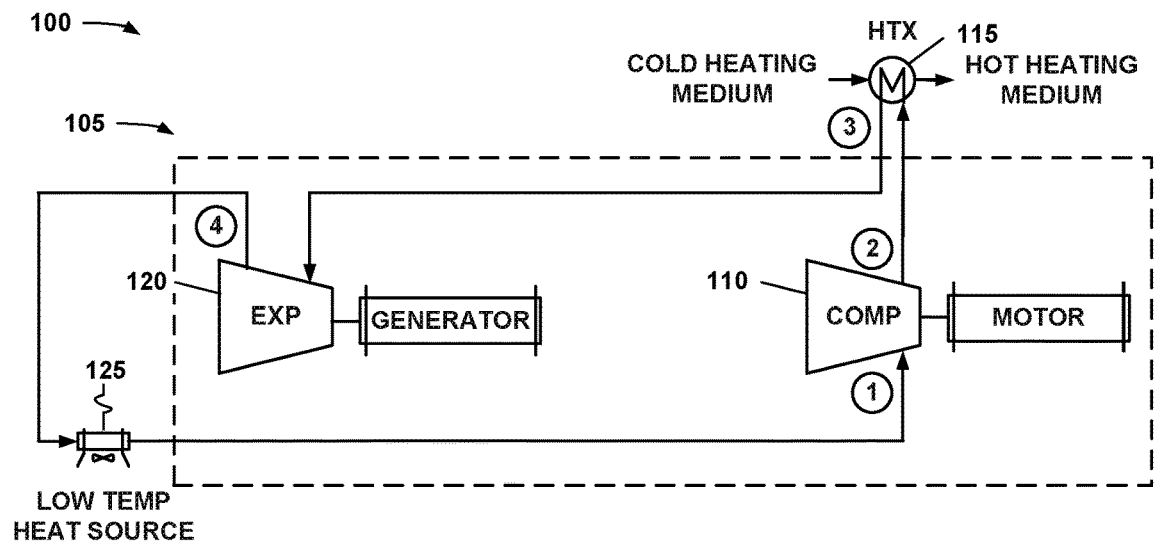
FIG. 1 depicts a prior art heat pump employing a traditional heat pump cycle that may be characterized as a simple heat pump cycle.

In contrast to direct electric heating, thermodynamic heat pump cycles can attain COP values well in excess of 1.0. However, cycle and working fluid limitations typically only permit modest heating temperatures in heat pumps. FIG. 1 depicts a prior art heat pump 100 employing a traditional heat pump cycle. The heat pump 100 circulates a working fluid (not otherwise shown) through a working fluid circuit 105. The heat pump 100 employs a number of well-known components to compress, expand, heat, cool, etc. the working fluid to place the working fluid in a variety of states defined by characteristics such as temperature, pressure, etc. The state of the working fluid at various points in the working fluid circuit 105 will be indicated using a convention well-known to the art in which a numeral is shown in a circle.

In the traditional heat pump cycle 100, the working fluid is compressed using a compression device 110, such as a compressor, from a first relatively low temperature, low pressure State 1 to one of higher temperature and pressure, State 2. The heat introduced to the working fluid by the compression can then be transferred to a thermal medium that receives and either uses or stores that heat. In FIG. 1, this transfer occurs in a heat exchanger ("HTX") 115. The thermal medium starts at an initial temperature $T_{h1}$ and may be referred to as the "cold" heating thermal medium. The cold heating thermal medium is heated to a higher temperature, $T_{h2}$, whereupon it may be referred to as the "hot" heating thermal medium.

During the process of heating the thermal medium, the working fluid is cooled to State 3. The fluid is then expanded to State 4 using an expansion device 120. The expansion device 120 may be an expander such as an adiabatic expansion valve or a fluid expander that also extracts thermodynamic work from the fluid. The temperature and pressure of the working fluid decrease in the expansion device 120 to State 4. Low-temperature heat is then added to the working fluid from an external low-temperature source 125 to bring the working fluid back to State 1. In many cases, the low-temperature heat source may be ambient heat from the environment in which the heat pump 100 is operating.

Figure 2:
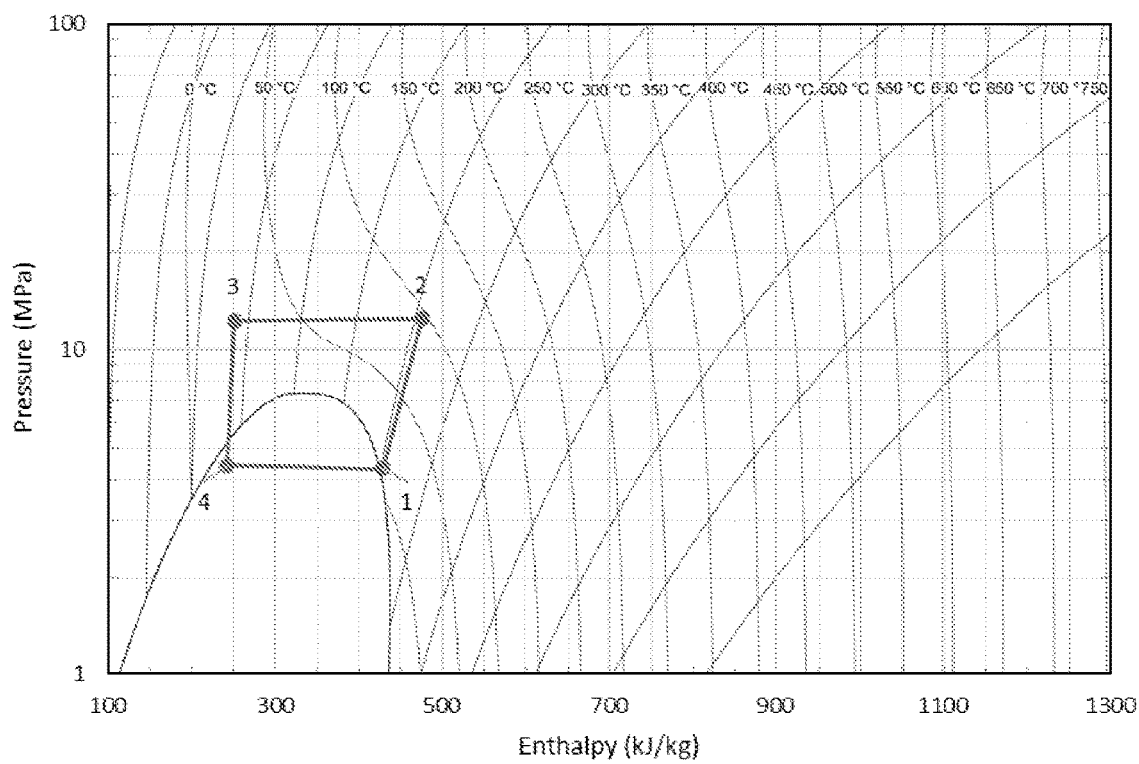
FIG. 2 is a pressure-enthalpy ("PH") diagram for the heat pump cycle of the heat pump in FIG. 1.

The thermodynamic process for the heat pump cycle in FIG. 1 can also be shown on the pressure-enthalpy diagram in FIG. 2. For some applications, a conventional heat pump cycle provides a good combination of performance and simplicity. For instance, $CO_2$ heat pumps are frequently used to heat water from ambient temperature to domestic hot water heating temperature.

The net specific work required to transfer the heat can be represented by the enthalpy increase during the compression process (State 1 to State 2), less the enthalpy decrease during the expansion process (State 3 to State 4). The amount of heat transferred to the thermal medium is represented by the enthalpy change in the high-temperature heat exchanger 115 (State 2 to State 3). One performance parameter of a heat pump cycle previously introduced is the Coefficient of Performance ("COP"), which in this context is the heat transferred divided by the net specific work. Consistent with the previous definition of COP, one can represent the COP by following expression:

$$COP = \frac{Q_h}{W_{net}} = \frac{h_3 - h_2}{(h_2 - h_1) - (h_4 - h_3)}$$

In the equation above, $Q_h$ is the heat transferred, $W_{net}$ is the net specific work, and h1-h4 are the specific enthalpy of the working fluid at States 1 through 4 respectively in FIG. 1.

Other performance parameters are the temperature to which the thermal medium is heated ($T_{h2}$), and the temperature "range". The temperature range is the difference between the final temperature of the thermal medium and its initial temperature ($T_{range}=T_{h2} T_{h1}$). Another parameter is "lift", which may be mathematically represented as Lift=$T_{h2}-T_{source}$, where $T_{source}$ is the temperature of the heat source. Based on fundamental thermodynamic and heat transfer principles, for heat to transfer to the thermal medium, the working fluid temperature in State 2 ($T_2$) must be greater than $T_{h2}$, and the working fluid temperature in State 3 ($T_3$) must be greater than $T_{h1}$.

Figure 3:
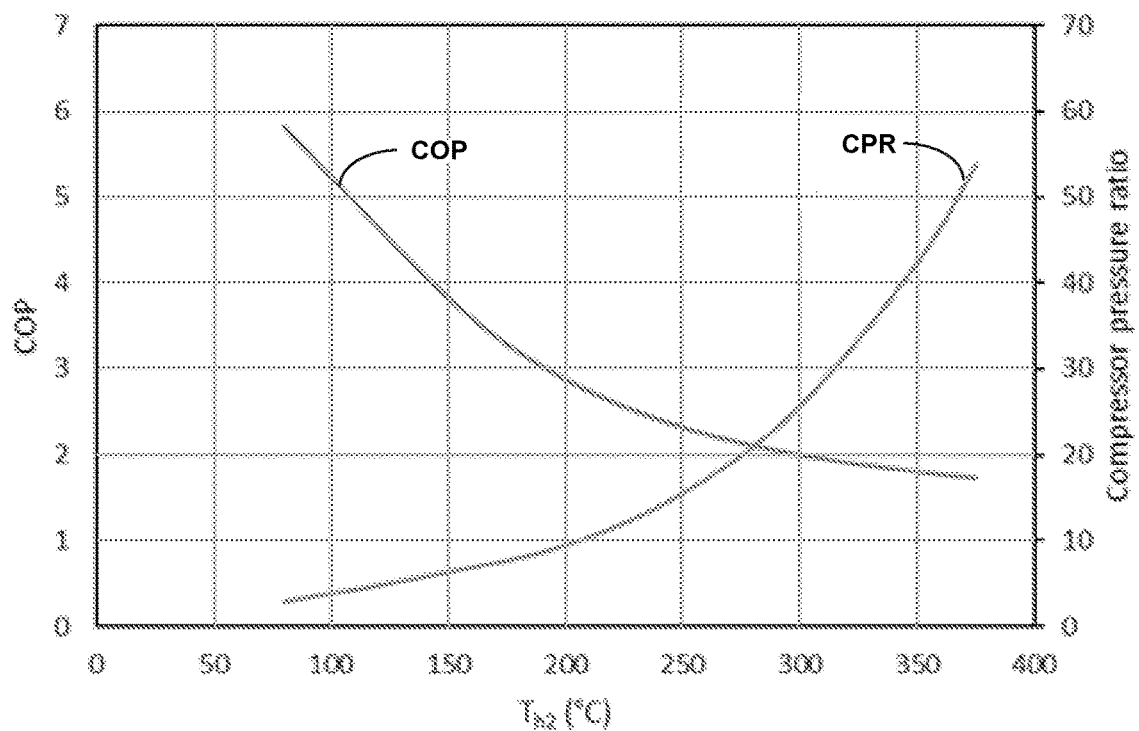
FIG. 3 illustrates a Coefficient of Performance ("COP") and required compressor pressure ratio ("CPR") as a function of the maximum temperature of the heated thermal medium ($T_{h2}$).

To achieve this combination of performance parameters, the baseline heat pump cycle described above must use an extremely high compressor pressure ratio ("CPR"). This adds significantly to the cost of the system, and beyond certain pressure ratios (typically around 10:1), the solution becomes impractical. In the case shown in FIG. 3, heat was extracted from a 15° C. environment, and added to a $T_{h1}$=20° C. fluid. In practice, the maximum achievable $T_{h2}$ with the simple heat pump cycle is roughly 200° C.

Figure 4:
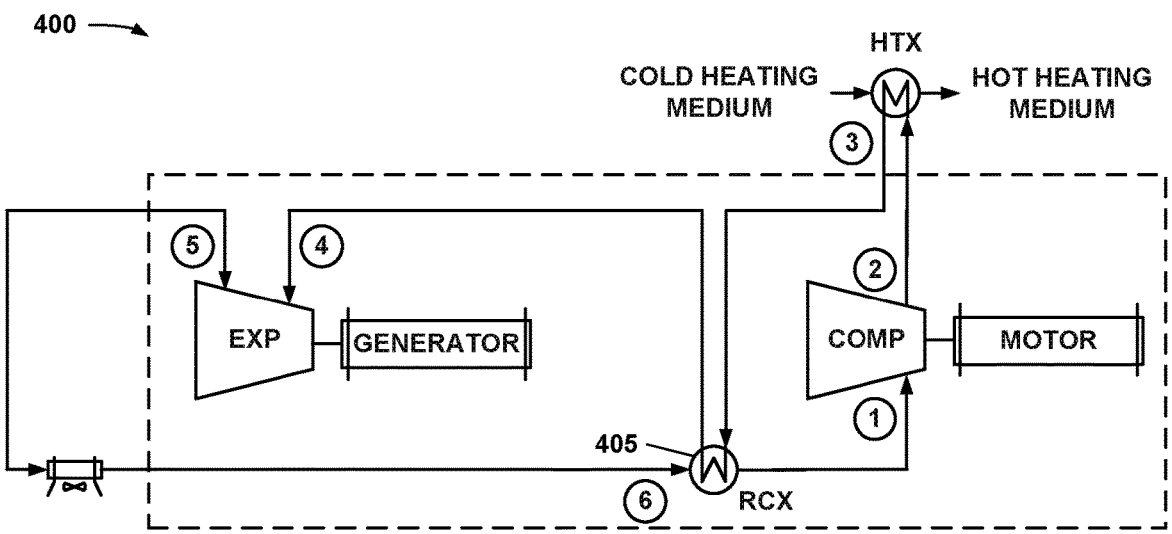
FIG. 4 depicts a prior art heat pump employing a simple recuperated heat pump cycle.

The heat pump cycle illustrated in FIG. 1-FIG. 2 may be referred to as a "simple heat pump cycle". FIG. 4 depicts a prior art heat pump 400 employing what is known as a recuperated, simple heat pump cycle. The heat pump 400 includes a recuperator ("RCX") 405. The recuperator 405 transfers heat from a first portion of the working fluid circulating in the working fluid circuit to another portion of the working fluid.

Figure 5:
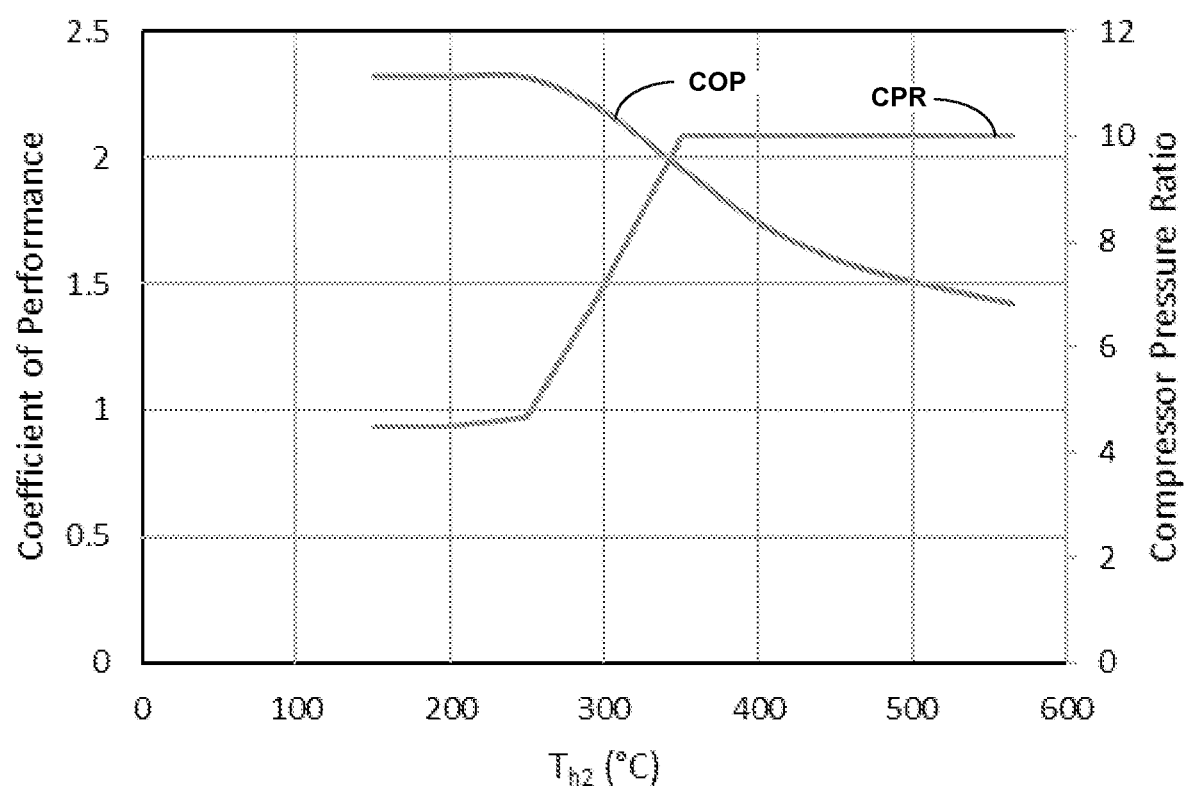
FIG. 5 graphs the coefficient of performance and compressor pressure ratio for the simple recuperated cycle in FIG. 4 as a function of the thermal medium temperature.

The performance of the recuperated heat pump cycle is better than the simple heat pump cycle for $T_{h2}$ values greater than approximately $T_{h2}$=200-250° C. For these simulations used to generate FIG. 5, the compressor pressure ratio was limited to be no greater than 10:1. FIG. 5 graphs the coefficient of performance and compressor pressure ratio for the simple recuperated cycle 400 in FIG. 4 as a function of the thermal medium temperature.

Figure 6A:
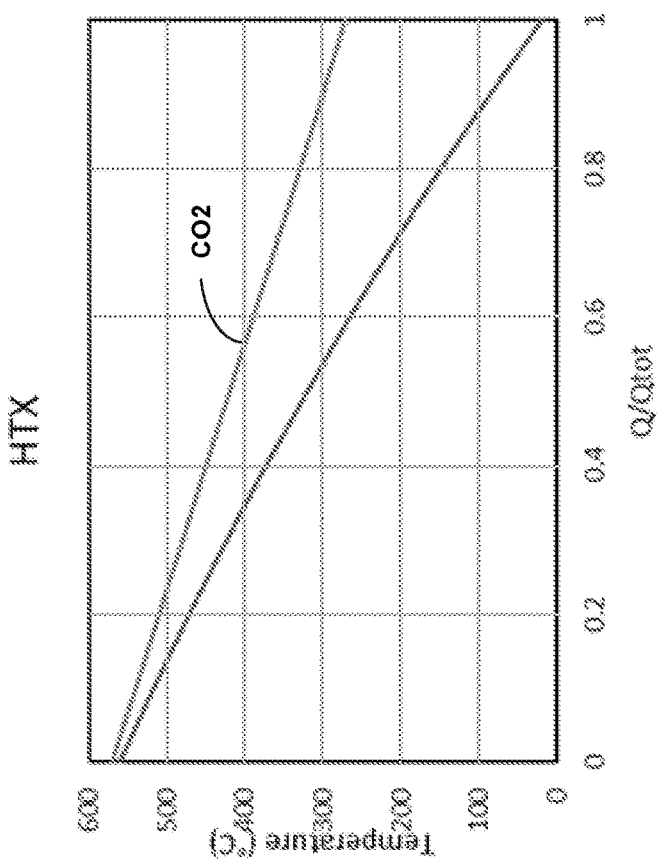
FIG. 6A-FIG. 6B are TQ plots graphing the temperature versus the heat duty for the simple recuperated cycle, high-temperature heat exchanger and recuperator, respectively, of the heat pump of FIG. 4.
Figure 6B:
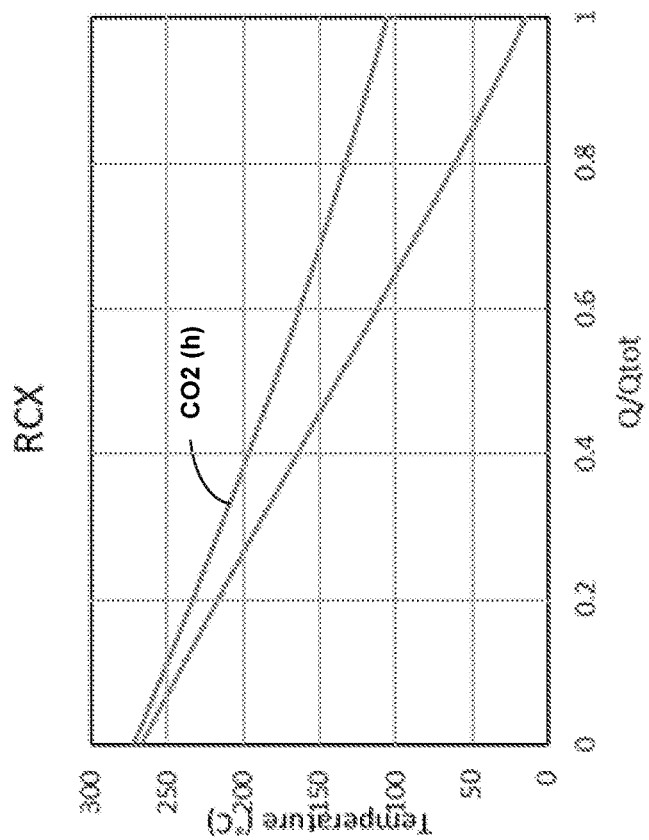

However, another factor in heat pump performance is the COP at a combined high $T_{range}$ and $T_{h2}$. Here, the simple recuperated cycle is limited in its ability to provide this combination of attributes. FIG. 6A is the TQ plot for the heat exchanger 115 and FIG. 6B is a TQ plot for the recuperator 405 of FIG. 4. A TQ plot graphs the temperature versus the heat duty $Q/Q_{tot}$.

As FIG. 6A-FIG. 6B show, while the simple recuperated system can achieve high range, it is limited by the recuperation process itself to relatively high working fluid temperature exiting the heat exchanger 115, shown in FIG. 1. As a result, the TQ curves have markedly different slopes, which represent exergy loss in the recuperator and heat exchanger 115. In addition, the large mismatch of specific heat capacity values at the different pressures within the system also results in a major slope difference in the recuperator TQ plot of FIG. 6B, further adding exergy destruction to the cycle and reducing its performance.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This disclosure describes a "dual rail" heat pump cycle that flexibly allows for a flowing thermal medium to be heated over a wide range of temperatures and obtain excellent heat pump performance values. The dual rail heat pump cycle increases the heat pump's capability to increased $T_{h2}$, while also keeping a large $T_{range}$, and still maintaining a good COP. A second embodiment that is a variant of the first is then disclosed. In the next, more complex, heat pump cycle, two internal heat exchangers, each called a "recuperator", are used to transfer some of the residual heat downstream of the heat exchanger to preheat the working fluid prior to entering the compression device.

Figure 7:
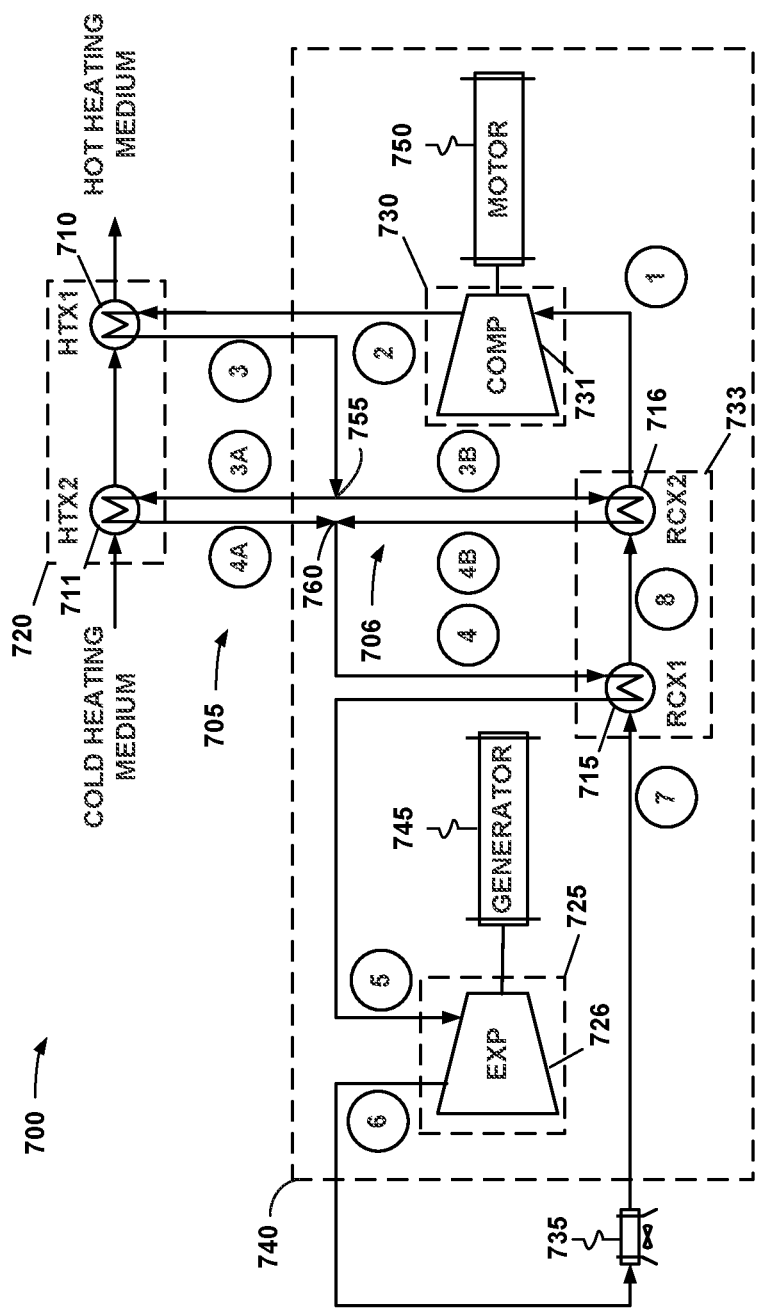
FIG. 7 is a process flow diagram of a first embodiment of a dual rail heat pump cycle in accordance with one or more embodiments of the subject matter claimed below.

FIG. 7 is a process flow diagram of a first embodiment of a dual rail heat pump cycle 700 in accordance with one or more embodiments of the subject matter claimed below. The dual rail heat pump cycle 700 is so-called because of the parallel recuperator and HTX flow paths 705, 706. Note that the parallel flow paths, or "rails", 705, 706 run between the recuperation process 733 and the heat exchange process 720. More particularly, the first rail 705 comprises the flow path from the split at the point 755 in which the working fluid is in States 3A and 4A as well as the second high-temperature heat exchanger 711. The second rail 706 comprises the flow path from the split at point 755 in which the working fluid is in States 3B and 4B and as well as the second recuperator 716. Thus, "parallel path" or "parallel rails" may be considered flow paths as originating at a point in the cycle where the working fluid flow is split into multiple conduits that will be recombined at another point in the cycle.

Figure 8:
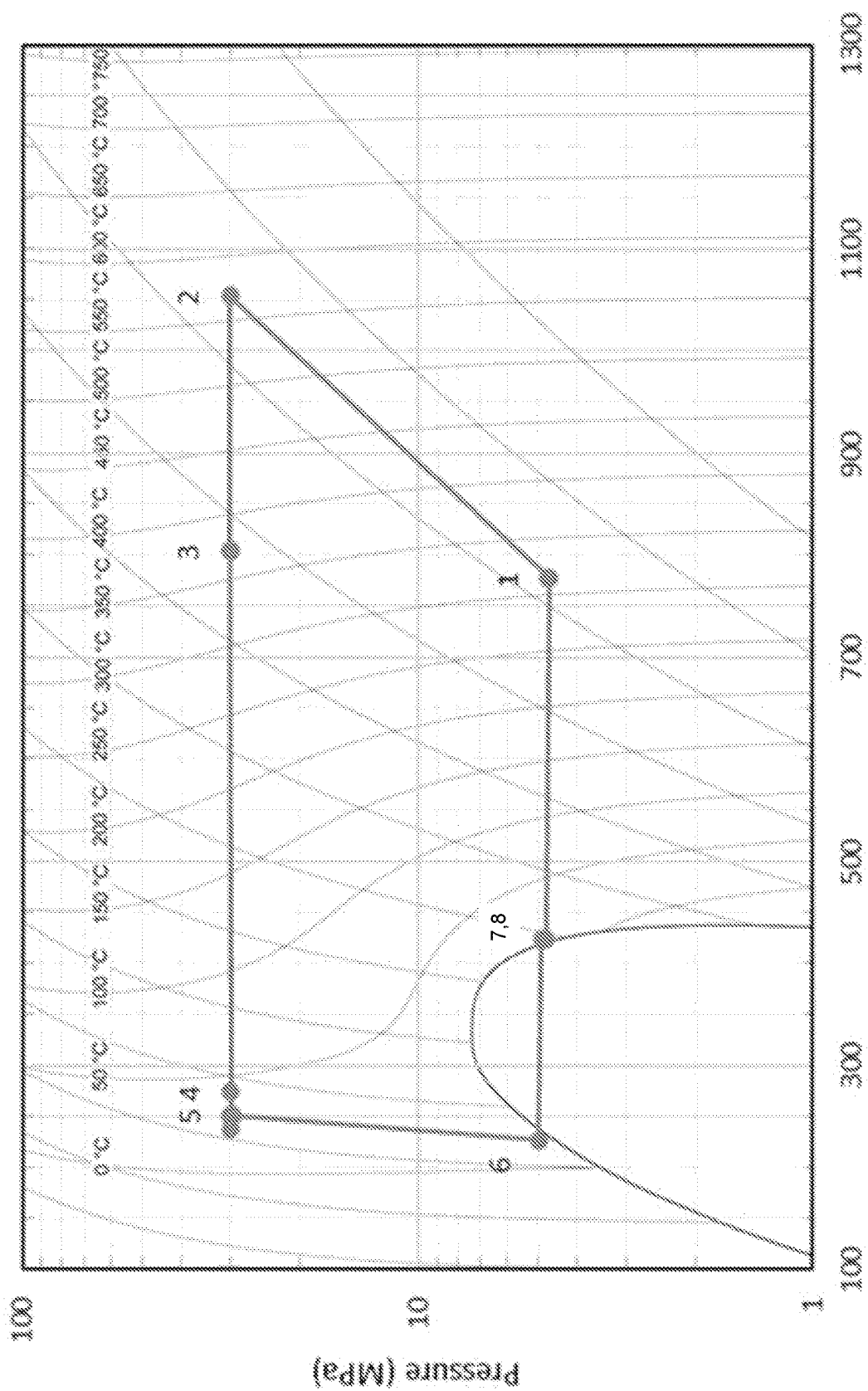
FIG. 8 is a pressure-enthalpy ("PH") diagram for the heat pump cycle of the dual rail heat pump cycle in FIG. 7 at $T_{h2}$=565° C., $T_{range}$=545° C.
Figure 9B:
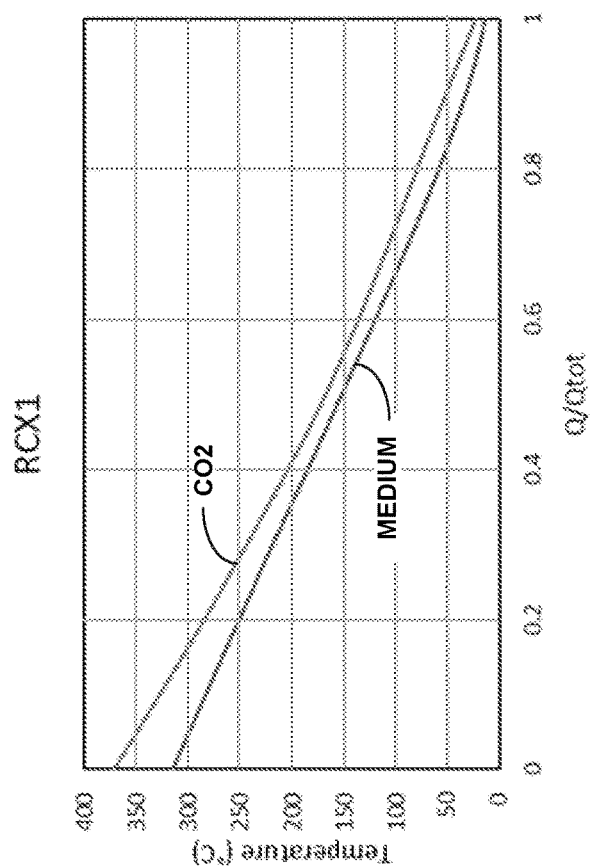
FIG. 9A-FIG. 9B are TQ plots for the heat exchangers and the recuperators of the of the dual rail heat pump cycle in FIG. 7.
Figure 9A:
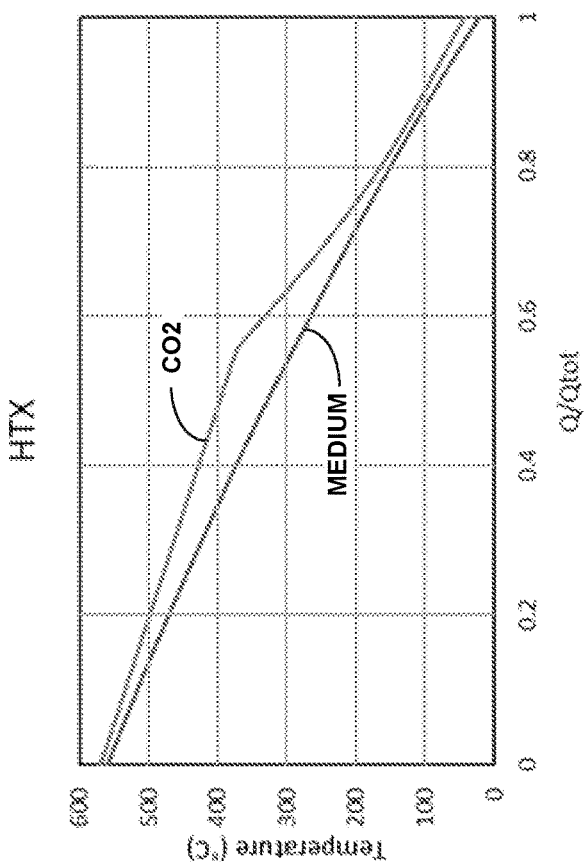

FIG. 8 is a pressure-enthalpy ("PH") diagram for the heat pump cycle of the dual rail heat pump cycle 700 in FIG. 7 at $T_{h2}$=565° C., $T_{range}$=545° C. FIG. 9A-FIG. 9B are TQ plots for the high-temperature heat exchangers 710, 711 and the recuperators 715, 716 of the of the dual rail heat pump cycle in FIG. 7. Those in the art having the benefit of this disclosure will note that, in FIG. 8, State 7 and State 8 occupy almost the same point in the graph. That is, States 7 and 8 are "on top of" one another. This fact implies that the presence of the recuperator 715 ("RCX1") provides little performance benefit over the recuperator 716 ("RCX2"), although that performance benefit provided by the recuperator 715 is not zero. Thus, some embodiments may omit the recuperator 716.

As used herein, the terms "low temperature" and "high temperature" in the context of heat exchange are defined relative to one another and relative to the temperature of the circulating working fluid. In the embodiments disclosed herein, "low temperature" can mean temperatures in the range of −25° C. to 50° C. and "high temperature" can mean 80 C to 600 C. However, in other embodiments, these numbers might differ. For example, in some embodiments, the heat source may be the ambient environment. In other embodiments, the low-temperature heat source may be a waste heat source rather than the ambient environment, in which case the low temperatures and the high temperatures may be higher than for the embodiments disclosed herein. A waste heat source will nevertheless still be "low temperature" in the sense that it is lower temperature than the target heat sink temperature ($T_{h2}$). However, it will generally be a higher temperature than the ambient environment.

Thus, as used herein, a "low-temperature" heat exchanger (where used) transfers heat from a heat source into the circulating working fluid. The heat is therefore transferred from a "higher" temperature heat source to a "lower" temperature working fluid. Conversely, a "high-temperature" heat exchanger transfers heat from a "higher temperature", circulating working fluid into a relatively "lower temperature" thermal medium. The temperatures at which the heat exchange occurs in the "high-temperature" heat exchanger occurs at temperatures greater than those at which the heat exchange occurs in the "low-temperature" heat exchanger.

The terms "high pressure" and "low pressure" are similarly defined relative to one another. For example, it may be said that the recuperation process 733 has a "high-pressure side" and a "low pressure side" that are defined by the expansion process 725 and the compression process 730. The working fluid in States 7-8 and 1 is at lower pressure due than the pressure of the working fluid in States 3B, 4B, and 4-5. (This is due to the actions of the expansion process 725 and the compression process 730, respectively.) The "side" of the recuperation process 733 in which the working fluid is in States 7-8 and 1 may therefore be referred to as the "low pressure side" and the "side" I which the working fluid is in States 3B, 4B, and 4-5 may therefore be referred to as the "high-pressure side".

Thus, precise numerical quantification for the terms "high temperature", "low temperature", "high pressure" and "low pressure" in the context of heat exchange will depend on implementation specific details of any given embodiment. While representative numerical quantifications may be provided herein for the illustrated embodiments, it is likely that other embodiments not illustrated may employ other numerical quantifications. Those in the art having the benefit of this disclosure will be able to readily determine suitable numerical quantifications for a particular embodiment.

The dual rail heat pump cycle 700 includes a heat exchange process ("HTX") 720, an expansion process 725, a compression process 730, a recuperation process 733, and a low-temperature heat source 735. The working fluid circulates through the heat exchange process 720, expansion process 725, compression process 730, and low-temperature heat source 735, through a working fluid circuit 740. The working fluid in this particular embodiment is Carbon dioxide ($CO_2$). Alternative embodiments may employ other working fluids. The thermal medium heated by the heat exchange process 720 may be, for example and without limitation, any flowing thermal medium such as air, water, heat transfer fluid, or molten salt. The working fluid circuit 740 also includes, in this particular embodiment, a generator 745 driven by the expansion process 725 and a motor 750 driving the compression process 730.

The expansion process 725 and the compression process 730 employ at least one expansion device 726 and at least one compression device 731, respectively. The compression device 731 may be a compressor, such as a fully hermetic reciprocating compressor or a scroll compressor or a centrifugal compressor. The expansion device may be an expander, such as an adiabatic expansion valve or a fluid expander. The fluid expander may be a turbine, or a reciprocating expander, or a scroll expander, for example. Those skilled in the art having the benefit of this disclosure may appreciate still other implementations.

Referring now to both FIG. 7 and FIG. 8, dual rail heat pump cycle 700 exchanges heat between a thermal medium and the working fluid in the heat exchange process 720. In this first embodiment of the dual rail heat pump cycle, the heat exchange process 720 is divided into two stages. Each of the two stages is represented by a respective one of the high-temperature heat exchangers 710 ("HTX1"), 711 ("HTX2").

In the first stage, the working fluid transfers heat to the thermal medium in the heat exchanger 710, heating the thermal medium and cooling the working fluid. The working fluid enters the heat exchanger 710 in a State 2, whereupon heat is exchanged between the working fluid and the thermal medium. This heat exchange heats the thermal medium and cools the working fluid.

Upon exiting the first stage of the heat exchange process 720 in State 3, the working fluid is then divided into two portions at a point 755. The first portion in state 3A enters a second stage of the heat exchange process 720. In the second stage, represented by the heat exchanger 711, the working fluid is further cooled, which preheats the thermal medium. Note that the terminology "first" and "second" relative to the heat exchange process 720 is from the perspective of the working fluid circulation. The thermal medium is flowing in the opposite direction of the working fluid. Thus, from the perspective of the thermal medium, the thermal medium is preheated in the second heat exchanger 711 before a second heating in the first heat exchanger 710, the working fluid being cooled in both exchanges. The second portion of the working fluid in State 3B enters a second recuperator 716 ("RCX2"), where the second portion is cooled and preheats the working fluid on the low-pressure side of the system (State 8 to State 1).

Upon the first portion exiting the second stage of the heat exchange process 720, represented by the heat exchanger 711, in State 4A and the second recuperator 716 in State 4B, the flow recombines the first and second portions at point 760. The recombined working fluid in State 4 then enters into an additional, first recuperator ("RCX1") 715 for further cooling of the high-pressure working fluid (State 4 to State 5) and preheating the low-pressure working fluid (State 7 to State 8). The high-pressure working fluid then enters the expansion device 726 in State 5, where work may be extracted, and the working fluid pressure and temperature are reduced to State 6. Heat is then added from the environment or similar source (i.e., the low-temperature heat source 735) as the working fluid is brought from State 6 to State 7.

The division of the working fluid into two portions allows for better matching of the heat capacities, defined as the mathematical product of the mass flow rate and the specific heat capacity, in the two sides—i.e., the high-pressure side (State 3B to State 4B) and the low pressure side (State 8 to State 1)—of the second recuperator (716). In addition, the working fluid can then be cooled to a lower temperature than it can in the single recuperated cycle, which also allows its TQ slope to better match the thermal medium thermal slope as shown in FIG. 9A and FIG. 9B. Both effects reduce the exergy destruction of the cycle and improve its performance.

Figure 10:
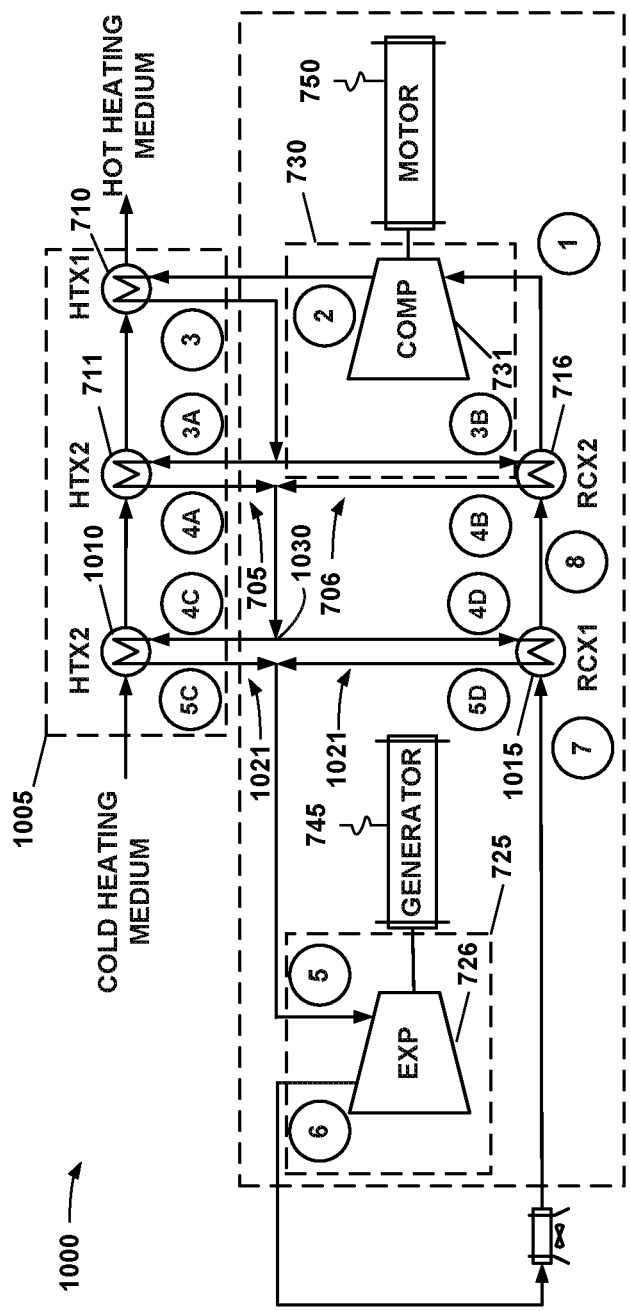
FIG. 10 is a process flow diagram of a second embodiment of a dual rail heat pump cycle in accordance with one or more embodiments of the subject matter claimed below.

FIG. 10 illustrates a second embodiment of the dual rail heat pump cycle, which may be referred to as an "extended" dual rail heat pump cycle. The dual rail heat pump cycle of FIG. 10 shares some common parts with the dual rail heat pump cycle of FIG. 7. These common parts bear like numbers and will not be discussed again here. This discussion will instead focus on differences between the dual rail heat pump cycles of FIG. 7 and FIG. 10.

In the extended dual rail heat pump cycle 1000, the working fluid may be additionally split at State 4, where a first portion (State 4C) enters an additional lower-temperature stage of the heat exchange process 1005 ("HTX") represented by a high-temperature heat exchanger 1010 ("HTX3"). The working fluid then is further cooled while further preheating the thermal medium in the third high-temperature heat exchanger. The second portion (State 4D) of the working fluid enters the first recuperator 1015 ("RCX1"), where it is cooled, while heating the low-pressure working fluid (State 7 to State 8).

Note the presence of the third and fourth parallel flow paths 1020, 1021. The third parallel flow path 1020 More particularly, the third rail 1020 comprises the flow path from the split at the point 1030 in which the working fluid is in States 4C and 4D as well as the third high temperature heat exchanger 1010. The fourth rail 1021 comprises the flow path from the split at point 1030 in which the working fluid is in States 4D and 5D and as well as the recuperator 1015. Those in the art having the benefit of this disclosure will appreciate that it is possible to conceive additional configurations that repeat the flow split and parallel HTX and RCX flow paths any number of times, with the purpose of further matching the heat capacities of the fluids on either side of the heat exchangers.

Figure 11:
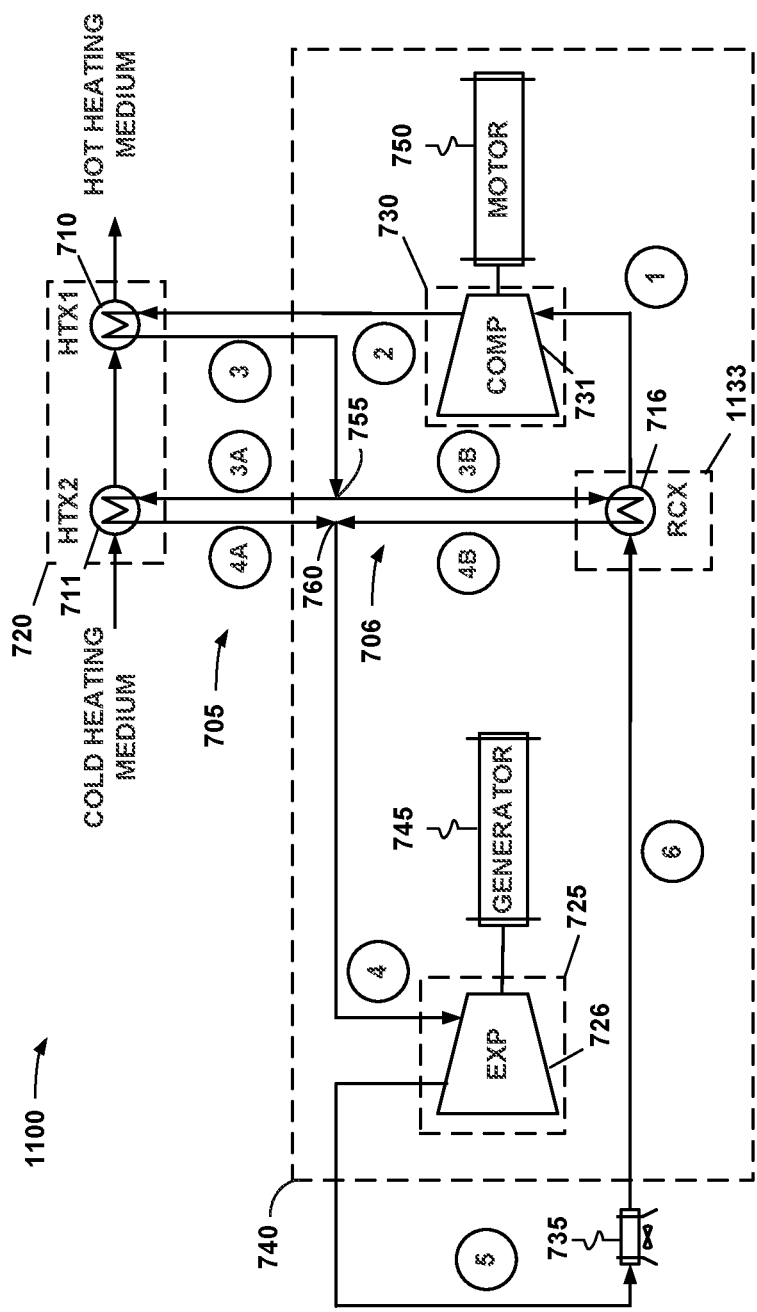
FIG. 11 is a process flow diagram of a first embodiment of a dual rail heat pump cycle in accordance with one or more embodiments of the subject matter claimed below.

As was mentioned above in the discussion of FIG. 7, some embodiments may omit one of the recuperators 715, 716 in the recuperation process 733. FIG. 11 illustrates a heat pump cycle 1100 in which the recuperation process 1133 uses only a single recuperator 716. The design of the heat pump cycle 1100 is a variation on the heat pump cycle 700 of FIG. 7, and like parts bear like numbers. Note that the number of states for the working fluid is reduced from eight to six and that the rails 705, 706 remain unchanged.

As those in the art having the benefit of this disclosure will appreciate, the heat pump cycles of FIG. 7, FIG. 10, and FIG. 11, as well as other embodiments, may also include thermal reservoirs, other heat exchangers, piping, pumps, valves and other controls not separately shown. For example, the flow of the working fluid through the working fluid circuit is generally a function of programmed control of fluid flow valves. These other components are not shown in FIG. 7, FIG. 10, and FIG. 11 for the sake of clarity and so as not to obscure that which is claimed below within the present discussion.

Figure 12:
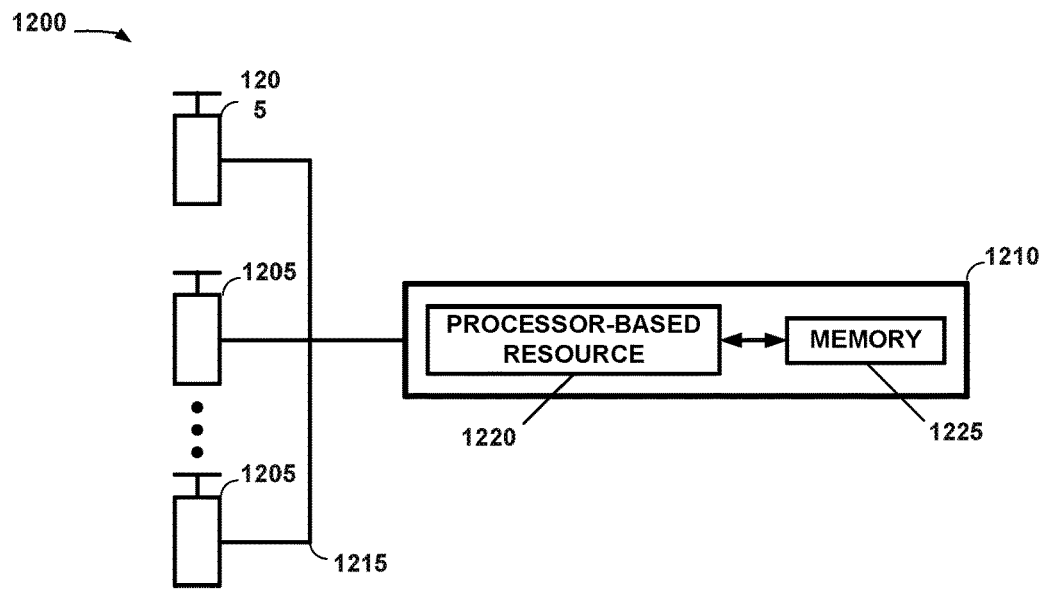
FIG. 12 is a block diagram of a control system including a programmed controller such as may be used to control fluid flow of the working fluid in some embodiments.

Although such control systems are readily known to those in the art, one such control system 1200 is shown in FIG. 12 for the sake of completeness. The control system 1200 may include a plurality of fluid flow valves 1205 and a controller 1210 sending control signals over electrical lines 1215. A controller such as the controller 1210 may send control signals to the fluid flow valves 1205 to control the working fluid flow as described above.

The controller 1210 includes a processor-based resource 1220 that may be, for example and without limitation, a microcontroller, a microprocessor, an Application Specific Integrated Circuit ("ASIC"), an Electrically Erasable Programmable Read-Only Memory ("EEPROM"), or the like. Depending on the implementation of the processor-based resource, the controller 1210 may also include a memory 1225 encoded with instructions (not shown) executable by the processor-based resource 1220 to implement the functionality of the controller 1210. Again, depending on the implementation of the processor-based resource 1220, the memory 1225 may be a part of the processor-based resource 1220 or a stand-alone device. For example, the instructions may be firmware stored in the memory portion of a microprocessor or they may be a routine stored in a stand-alone read-only or random-access memory chip. Similarly, in some implementations of the processor-based resource 1220—e.g., an ASIC—the memory 1235 may be omitted altogether.

A flow control system may be used, more particularly, to control the flow of the working fluid between the two parallel paths, or rails. Referring to FIG. 7, for example, the flow control system may control the flow of the working fluid between the first rail 705 and the second rail 706. A programmable fluid control system such as the fluid control system 1200 in FIG. 12 may be particularly useful in implementing a variable distribution between/among the parallel flow paths to accommodate variations in operating conditions or changes in design parameters. However, in some embodiments, a programmable flow control system may be used to implement a fixed distribution of working fluid between/among the parallel flow paths. Still other embodiments may use a flow control system that is not programmable. For example, the valves may be manually set or controlled.

Figure 13:
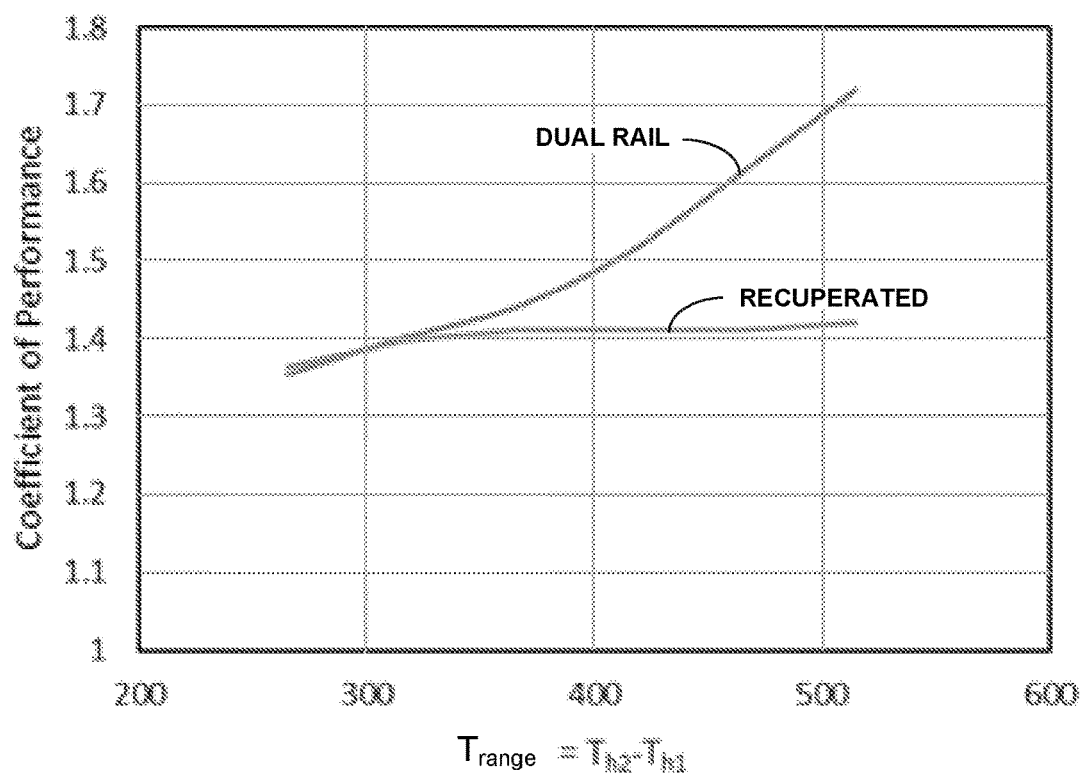
FIG. 13 compares the COP for the dual rail and single recuperated heat pump cycles as a function of $T_{range}$, with $T_{h2}$=565° C.

FIG. 13 illustrates the efficacy of the presently disclosed technique. The relative performance of the single recuperated heat pump in FIG. 4 and the dual rail heat pump in FIG. 7 are shown in the FIG. 11 for $T_{h2}=565°$ C., $T_{range}=265$ to 545° C. At relatively smaller values of $T_{range}$ (<350° C.), there is no apparent advantage to the dual rail heat pump cycle over the single recuperated cycle. However, at higher values of $T_{range}$, the dual rail cycle has a distinct performance advantage as evaluated by COP.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A dual rail heat pump cycle, comprising:
   a low-temperature heat source;
   a two-stage high-temperature heat exchanger unit comprising a first stage heat exchanger and a second stage heat exchanger through which, in operation, heat from a working fluid circulated within is transferred to a thermal medium moving through the high-temperature heat exchanger unit; and
   a working fluid circuit for circulating the working fluid within the dual rail heat pump cycle and through the high-temperature heat exchanger unit, the working fluid circuit including:
      an expander;
      a compressor;
      a recuperator unit interposed between the expander and the compressor, the recuperator unit comprising a first recuperator and a second recuperator and having a high-pressure side defined by the compressor and a low pressure side defined by the expander; wherein:
      the cooled high-pressure working fluid exiting the first stage heat exchanger is divided at a first point in the working fluid circuit into a first portion and a second portion, the first portion entering the second stage heat exchanger directly to heat the thermal medium and be further cooled, exiting as a further cooled high-pressure first portion of the working fluid, the second portion entering the second recuperator directly to be cooled, exiting as a cooled high-pressure second portion of the working fluid,
      the further cooled high-pressure first portion directly exiting the second stage heat exchanger and the cooled high-pressure second portion directly exiting the second recuperator being recombined at a second point in the working fluid circuit as a recombined high-pressure working fluid, thereby creating a pair of parallel flow paths between the first and second points directly between the second stage heat exchanger and the second recuperator, and
      the recombined high-pressure working fluid further cooled in the first recuperator, exiting as a further cooled recombined high-pressure working fluid flowing to the expander.

2. The dual rail heat pump cycle of claim 1, wherein the dual rail heat pump cycle is an extended dual rail heat pump cycle and wherein:
   the two-stage heat exchanger unit includes an extended stage heat exchanger;
   the recombined high-pressure working fluid is further divided at a third point in the working fluid circuit prior to the first recuperator into a second set of first and second portions, the first portion directly entering the extended stage heat exchanger and exiting as a cooler first portion, the second portion directly entering the first recuperator and exiting as a cooler second portion, each of the cooler first and second portions recombined at a fourth point in the working fluid circuit upstream of the expander, thereby creating a second pair of parallel flow paths between the third and fourth points directly between the extended stage heat exchanger and the first recuperator.

3. The dual rail heat pump cycle of claim 1, wherein the thermal medium flows through the heat exchanger.

4. The dual rail heat pump cycle of claim 1, wherein the dual rail heat pump cycle is an extended dual rail heat pump cycle further comprising:
   a third stage in the high-temperature heat exchanger; and
   a second pair of parallel flow paths between the recuperator and the high-temperature heat exchanger.

5. The dual rail heat pump cycle of claim 1, further comprising:
a generator driven by the expander; and
a motor driving the compressor.

6. The dual rail heat pump cycle of claim 1, wherein the compressor is selected from a group comprising a fully hermetic reciprocating compressor a scroll compressor a centrifugal compressor.

7. The dual rail heat pump cycle of claim 1, wherein the expander includes at least one expansion device.

8. The dual rail heat pump cycle of claim 7, wherein the expansion device comprises an adiabatic expansion valve or a fluid expander.

9. The dual rail heat pump cycle of claim 1, wherein the expander is an adiabatic expansion valve or a fluid expander.

10. The dual rail heat pump cycle of claim 9, wherein the fluid expander is selected from a group comprising a turbine, a reciprocating expander, a scroll expander.

11. A dual rail heat pump cycle, comprising:
a low-temperature heat source; and
a working fluid circuit through which, in operation, a working fluid circulates, the working fluid circuit including:
a recuperator;
a compression device defining a high-pressure side of the recuperator;
an expansion device downstream from the high-pressure side of recuperator, upstream from the low-temperature heat source, and defining a low-pressure side of the recuperator;
a pair of high-temperature first stage and second stage heat exchangers through which the thermal medium flows; and
a pair of parallel flow paths directly between the recuperator and the high-temperature second stage heat exchanger on the high-pressure side of the recuperator; wherein
the working fluid exits the compression device as a high-pressure working fluid that directly flows into the high-temperature first stage heat exchanger to release heat to the thermal medium and be cooled,
the high-pressure working fluid, directly upon exiting the high-temperature first stage heat exchanger is divided at a first point in the working fluid circuit into first and second portions, the first portion directly flowing into the high-temperature second stage heat exchanger to release heat to the thermal medium and be further cooled, the second portion directly flowing into the recuperator to be further cooled, each of the cooler first and second portions directly exiting the respective high-temperature second stage heat exchanger and recuperator being recombined at a second point in the working fluid circuit as a subsequently cooled high-pressure working fluid, thereby realizing the pair of parallel flow paths directly between the high-temperature second stage heat exchanger and the recuperator.

12. The dual rail heat pump cycle of claim 11, wherein the dual rail heat pump cycle is an extended dual rail heat pump cycle further comprising:
a third high-temperature heat exchanger through which the thermal medium flows; and
a second pair of parallel flow paths between the third high-temperature heat exchanger and the recuperator.

13. The dual rail heat pump cycle of claim 11, further comprising:
a generator driven by the expansion device; and
a motor driving the compression device.

14. The dual rail heat pump cycle of claim 11, wherein the compression device comprises a compressor.

15. The dual rail heat pump cycle of claim 11, wherein the compression device is selected from a group comprising a fully hermetic reciprocating compressor a scroll compressor a centrifugal compressor.

16. The dual rail heat pump cycle of claim 11, wherein the expansion device is an adiabatic expansion valve or a fluid expander.

17. The dual rail heat pump cycle of claim 16, wherein the fluid expander is selected from a group comprising a turbine, a reciprocating expander, a scroll expander.

18. A working fluid circuit of a dual rail heat pump cycle, the working fluid circuit adapted to circulate a working fluid therethrough and through a pair of first and second stage heat exchangers that are part of the dual rail heat pump cycle, where heat from the working fluid circulated within the pair of first and second heat exchangers is transferred to a thermal medium moving through the pair of first stage and second stage heat exchangers, the working fluid circuit comprising, at least:
a compressor, and
at least one recuperator, wherein
the working fluid exits the compressor as a high-pressure working fluid that directly flows into the first stage heat exchanger to release heat to the thermal medium and be cooled,
the high-pressure working fluid directly exiting the first stage heat exchanger is divided into first and second portions, the first portion directly flowing into the second stage heat exchanger to release heat to the thermal medium and be further cooled, the second portion directly flowing into the at least one recuperator to be further cooled, each of the cooler first and second portions directly exiting the respective second stage heat exchanger and at least one recuperator being recombined as a subsequently cooled high-pressure working fluid, thereby realizing a pair of parallel flow paths directly between the second stage heat exchanger and the at least one recuperator so as to facilitate matching of heat capacities of the working fluid on either side of the first stage and second stage heat exchangers.

19. The working fluid circuit of claim 18, wherein the at least one recuperator is embodied as a recuperator unit comprising a first recuperator in series with a second recuperator, the pair of parallel flow paths arranged directly between the second stage heat exchanger and the second recuperator.

20. The working fluid circuit of claim 19, further comprising an expander, wherein the recombined high-pressure working fluid enters the first recuperator, exiting as a further cooled recombined high-pressure working fluid flowing to the expander to complete the dual rail heat pump cycle.

21. The working fluid circuit of claim 19, wherein the second portion of the divided high-pressure working fluid that directly exited the first stage heat exchanger flows only through the second recuperator before being recombined with the first portion of the divided high-pressure working fluid that exits the second stage heat exchanger.

* * * * *